Patented Oct. 12, 1937

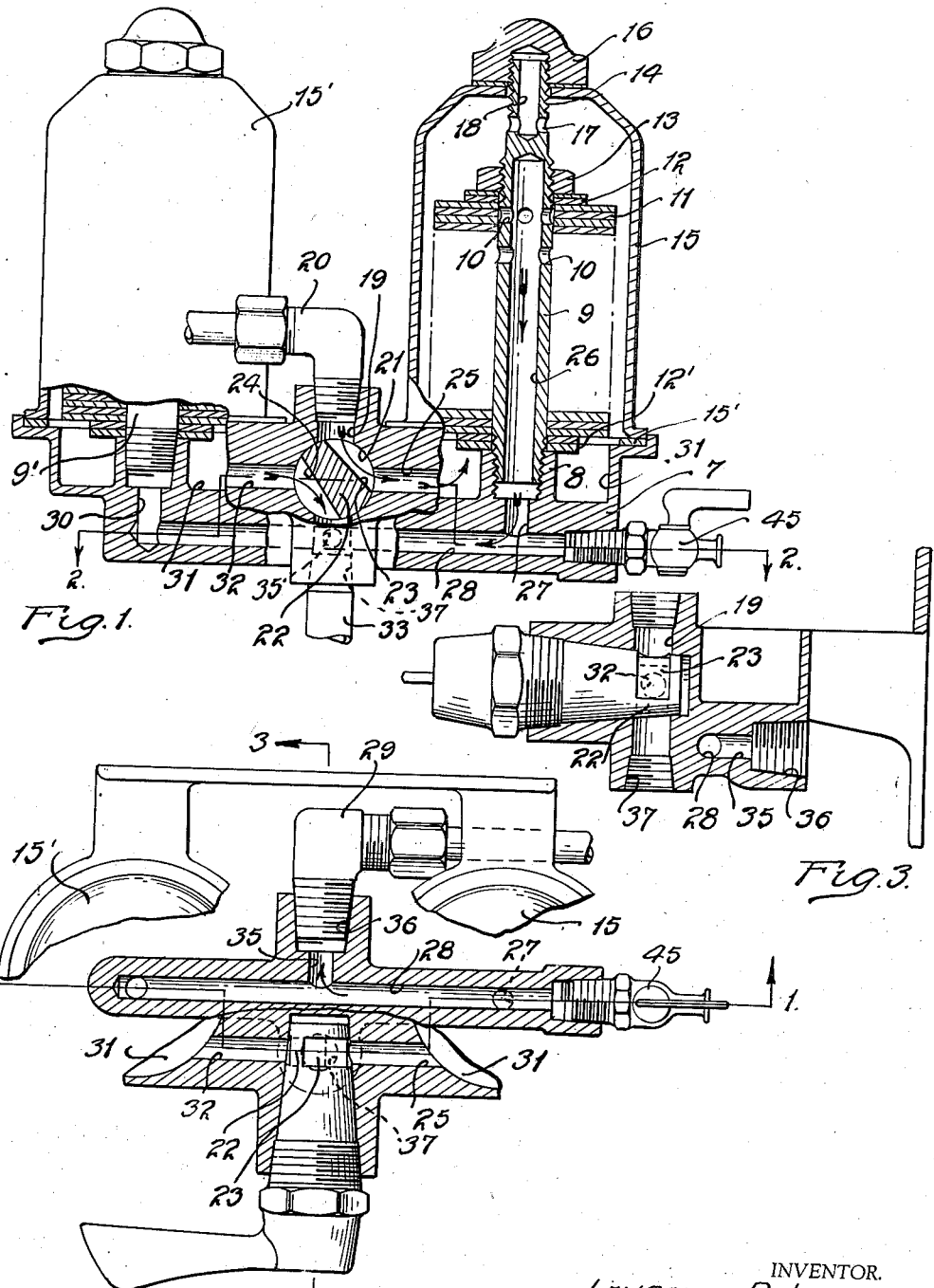

2,095,447

UNITED STATES PATENT OFFICE 2,095,447

FILTER

Lawrence R. Lentz, Columbus, Ohio

Application August 22, 1935, Serial No. 37,313

2 Claims. (Cl. 210—168)

My invention relates to a new and useful improvement in a filter adapted for use for filtering various liquids and particularly adapted for filtering gasoline, oil, and the like.

It is an object of the present invention to provide a filter comprising a plurality of filter elements so arranged and constructed that while one is being used for filtering purposes, the filtered fluid may flow into the other in a direction reversed to the normal direction of flow and effect a cleaning of the filtering element.

Another object of the invention is the provision of a filter of this class which will be simple of structure, economical of manufacture, durable, and highly efficient in use.

Another object of the invention is the provision of a filter of this class having a test cock connected therewith so as to ascertain whether or not the liquid is flowing through the filter element and approximately in what volume.

Another object of the invention is the provision in a filter of this class of a filter element comprising a plurality of superimposed flat discs of filter medium held together in compact relation.

Another object of the invention is the provision of a filter which may be used either as a suction type filter or as a gravity filter or force feed, and which in either case may be easily and quickly cleaned.

Other objects will appear hereinafter.

Fig. 1 is a central vertical view of the invention, taken on line 1—1.

Fig. 2 is a sectional view taken on line 2—2 of Fig. 1.

Fig. 3 is a sectional view taken on line 3—3 of Fig. 2 with parts removed.

The invention comprises a base 7 which is preferably formed from a casting and which is formed similar at opposite sides of the center so that a description of one side will suffice for both. Projecting upwardly from the base 7 centrally of the compartment 31, formed by recessing the base 7, is a boss 8 in which is threaded the tubular standard 9 provided intermediate its ends with radially directed openings 10. Embracing the stem 9 are the flat discs or washers 11 made from suitable filtering material such as, felt, chamois or the like and held in compact relation between the washers 12 and 12' by the nut 13 which is threaded on the standard 9. The upper end of the standard is reduced as at 14 and projected through the top of the cover 15 and provided with a nut 16 whereby the cover 15 may be held tightly against the washer 15' to effect a gas-tight and liquid-tight connection. The reduced portion 14 is formed with the central bore 18 which communicates with the radially extending openings 17. This is to facilitate the bleeding of air into the chamber or cover 15, but this structure in itself forms no part of the present invention.

Threaded into the passage 19 of the base 7 is the inlet or delivery pipe 20 whereby fuel may be delivered into the passage 19. As shown in Fig. 1 the fuel so delivered will pass into the opening 21 in which is rotatably mounted the stop cock 22 having its sides cut away as at 23 and 24. When the parts are as shown in Fig. 1 the fuel will pass from the opening 21 into the passage 25 and thence into the chamber 15 as indicated by the direction arrows. From the chamber 15 the fuel will pass through the filter members 11 through the openings 10 into the interior 26 of the standard 9 and thence through the passage 27 and the passage 28 into the passage 35 (shown in Fig. 2), and thence to the outlet pipe 29 which is threaded into the threaded boss 36. Passage 28 also communicates through the passage 30 with the interior of the standard 9' which leads into the filter element. This filtered fuel passing from the passage 27 will thus, in addition to passing through the outlet pipe 29, pass through the passage 30 into the interior of the standard 9' and thence through the washers in the filter 15' and outwardly into the space 31 communicating with which is the passage 32 which leads to the drain pipe 33 which is threaded into the threaded boss 37 and provided with a suitable stop cock 34. It is thus seen that the fuel passing into the filter through the pipe 20 is filtered in the filter 15 and then passes to the outlet pipe while a portion of the filtered fluid will pass into the interior of the filter 15' and thence outwardly through the filter washers to effect a cleaning of the same. The flow of the fluid in the filter 15' is the reverse to the direction of flow of the fluid in the filter 15. Consequently, when the stop cock 34 is opened the filter 15 will serve to filter the fluid which passes through the outlet pipe 29 and also this filtered fluid will serve to effect a cleaning of the filter element in the filter 15'. It is obvious that when the stop cock 22 is rotated to the proper position the fluid may flow from the delivery pipe 20 into the passage 32 into the space 31 to be filtered by the filter 15' so that the filter 15' thus serves as the filtering unit. At the same time the filtered fluid may also be used for cleaning the filter element in the filter 15.

When the filtered fluid is flowing, the passage 28 will normally be filled with the filtered fluid and communicating with this passage 38 is a test cock 45 whereby the fluid from the passage 28 may be bled outwardly when desired, to ascertain whether or not there is a flow of filtered fluid. This test cock 45 will serve as a test cock for both of the filter elements 15 and 15', and in the event that the device is used under conditions where suction is resorted to for removing the filtered fluid from the filter, the test cock 45 affords a means for blowing into the interior of the filter to clean the elements by pressure.

Thus it is believed apparent that in a very compact unit I have provided a plurality of filters, each so interconnected that the filtered fluid from one may be used for cleaning the filter element in the other without, to any appreciable extent, interfering with the normal flow of the filtered fluid through the outlet pipe. This is true because the unit is capable of filtering a larger amount of liquid or fluid than is required to meet the capacity of the outlet pipe. Consequently, an operator in using the filter on an engine for filtering the fuel supply may very easily and quickly switch from one filter to the other in the event one should become clogged and then, while using the other, very effectively and quickly clean the filter which has become clogged. It will be noted that it is the filtered fluid that is used for cleaning purposes, as it is quite important that nothing but filtered fluid have access to the interior of the filter, and the cleaning is effected by delivering fluid into the interior of the filter element.

While I have illustrated and described the preferred form of my invention, I do not wish to limit myself to the precise details of structure shown but desire to avail myself of such variations and modifications as may come within the scope of the appended claims.

Having thus described my invention what I claim is new and desire to secure by Letters Patent is:

1. A filter of the class described, comprising: a base having a pair of spaced recesses formed therein and provided intermediate of said recesses with a laterally extending opening, there being a pair of passages from the opposite sides of said opening and each passage communicating with one of said recesses; an inlet pipe communicating with said opening; a drain pipe communicating with said opening; a valve in said opening moveable to a pair of open positions for determining the communication of said inlet pipe with one of said passages and the drain pipe with the other of said passages simultaneously, the movement of said valve from one position to another determining the passages brought into communication with said inlet pipe; a filter chamber mounted on each of said recesses and adapted for the reception of liquid flowing through a passage into its recess; a hollow post closed at its top and provided with a plurality of lateral openings and extending centrally of each of said chambers upwardly from said base, said post being closed at its top and communicating at its bottom with an elongated passage formed in said base; a plurality of filter members embracing said post at said lateral openings and pressed together in compact relation, the interior of each of said posts being constantly in communication with said elongated passage; and an outlet pipe communicating with said passage.

2. A filter of the class described, comprising: a pair of spaced apart filter members each comprising a tubular post closed at one end and provided intermediate its ends with a plurality of openings; a filter medium surrounding said post at said openings; a filter chamber embracing said filter members and said post to provide a liquid type receptacle, the interior of said posts being in communication through a common passage; an outlet delivery pipe communicating with said passage; a drain pipe; an inlet delivery pipe; and means for establishing communication of said inlet delivery pipe with the interior of one of said chambers and simultaneously establishing communication of the interior of the other of said chambers with said drain pipe.

LAWRENCE R. LENTZ.